June 17, 1958  W. OWEN  2,838,898
GLASS HANDLING MECHANISM
Filed May 31, 1952  9 Sheets-Sheet 1

INVENTOR.
WILLIAM OWEN
BY
Oscar L. Spencer
ATTORNEY

FIG. 3

INVENTOR.
WILLIAM OWEN
BY
Oscar L. Spencer
ATTORNEY

June 17, 1958  W. OWEN  2,838,898
GLASS HANDLING MECHANISM
Filed May 31, 1952  9 Sheets-Sheet 4

FIG. 4

INVENTOR.
WILLIAM OWEN
BY
Oscar L. Spencer
ATTORNEY

June 17, 1958  W. OWEN  2,838,898
GLASS HANDLING MECHANISM
Filed May 31, 1952  9 Sheets-Sheet 5

INVENTOR.
WILLIAM OWEN
BY
Oscar L. Spencer
ATTORNEY

June 17, 1958  W. OWEN  2,838,898
GLASS HANDLING MECHANISM
Filed May 31, 1952  9 Sheets-Sheet 7

INVENTOR.
WILLIAM OWEN
BY
Oscar L. Spencer
ATTORNEY

June 17, 1958 W. OWEN 2,838,898
GLASS HANDLING MECHANISM

Filed May 31, 1952 9 Sheets-Sheet 8

INVENTOR.
WILLIAM OWEN
BY
Oscar L. Spencer
ATTORNEY

United States Patent Office 2,838,898
Patented June 17, 1958

2,838,898

GLASS HANDLING MECHANISM

William Owen, Pittsburgh, Pa., assignor to Pittsburgh Plate Glass Company, Allegheny County, Pa., a corporation of Pennsylvania Application May 31, 1952, Serial No. 291,028

8 Claims. (Cl. 53—244)

This invention pertains generally to glass handling mechanisms and, more specifically, to mechanisms for loading and unloading glass sheets into and from a suitable container or basket which carries the glass sheets in vertical position through an annealing lehr.

In the broadest aspect of the invention, the herein described invention is adaptable for handling glass sheets of any desired sizes where it is desired to remove the sheets from one location and deposit them in another location within reach of the mechanism.

In the continuous manufacture of window glass, the molten glass is withdrawn from the melting furnace and passed vertically upward through a series of rolls until it has cooled and is then cut to size. Such glass has highly polished surfaces, cuts readily, and without annealing is highly suitable for glazing and other purposes. For some purposes it is desirable to anneal the glass and in order to avoid marring the face of the glass sheets it has been found desirable to pass the glass sheets in a vertical position through the annealing lehr. Containers or baskets of various construction may be provided to support the glass in passing through the annealing lehr and a specific form of the basket is disclosed herein.

The glass, as it comes from the drawing machines, is in large, stock sizes which are later cut into smaller sizes to meet customer requirements. In the interest of economy, it is proposed to anneal the glass in these larger stock sizes. Such stock sizes are too large to be readily handled by one man, and to avoid danger in manually loading the sheets into the annealing basket, it is proposed to load them by a suitable mechanism. The glass sheets when taken from the drawing machines are usually stacked on one edge in an inclined position into what are known as packs. These packs contain any suitable number of sheets depending upon the thickness thereof and in this form are delivered to the annealing lehr. There the packs are mounted on suitable racks and again placed on edge in an inclined position. Frequently the packs are mounted on a turntable so that a plurality of packs may be positioned adjacent the basket loading mechanism.

When loading the sheets of glass in the annealing basket it is desirable that the sheets be positioned substantially vertical in the basket to avoid distortion of the sheets during the annealing process and to also space the sheets horizontally in the basket to affect uniform heating and cooling of the sheets as the basket passes through the annealing lehr. The glass sheets when in the pack are usually supported upon a different linear edge of the sheet than when in the annealing basket and it is desirable to have the loading mechanism turn and load the sheets in one operation in the interest of economy.

One object of the present invention is to provide loading mechanism having an automatically operated loading cycle which, starting from initial position, will remove a sheet from the pack, position it within the annealing basket and return to initial position.

Another object of the invention is to provide a loading device of the character described which will take a sheet of glass from substantially floor level and position it in a basket which is positioned above floor level.

Another object of the invention is to provide a loading device of the character described which will automatically space the sheets within the basket.

Another object of the invention is to provide an automatic loading device of the character described with a flexible control so that the device may be manually controlled to repeat any specific automatic cycle in the event one of the glass sheets becomes broken in the loading operation.

Another object of the invention is to provide a loading device of the character described which may be readily modified or reversed in operation so as to be used for automatically unloading baskets and stacking the sheets in packs.

A still further object of the invention is to provide a loading device of the character described which is fast in execution of a loading or unloading cycle and yet cushioned during any change in direction of motion to prevent damage to the glass or mechanism.

These and other objects will be made apparent as the description proceeds with enumeration of the drawings in which.

Referring now in detail to the drawings, reference character 1 indicates a conventional showing of an annealing lehr having at one end basket loading tracks 2 upon which are mounted baskets 3 and at the other end an unloading track 4 showing the baskets 3 in various unloading positions. Adjacent the lehr 1 and connecting the basket loading tracks 2 and 4 is a basket return track 5. At opposite ends of the lehr are located the glass pack turntables 6 and 7 adjacent which are appropriate loading and unloading mechanisms 8 and 9.

Figure 3:
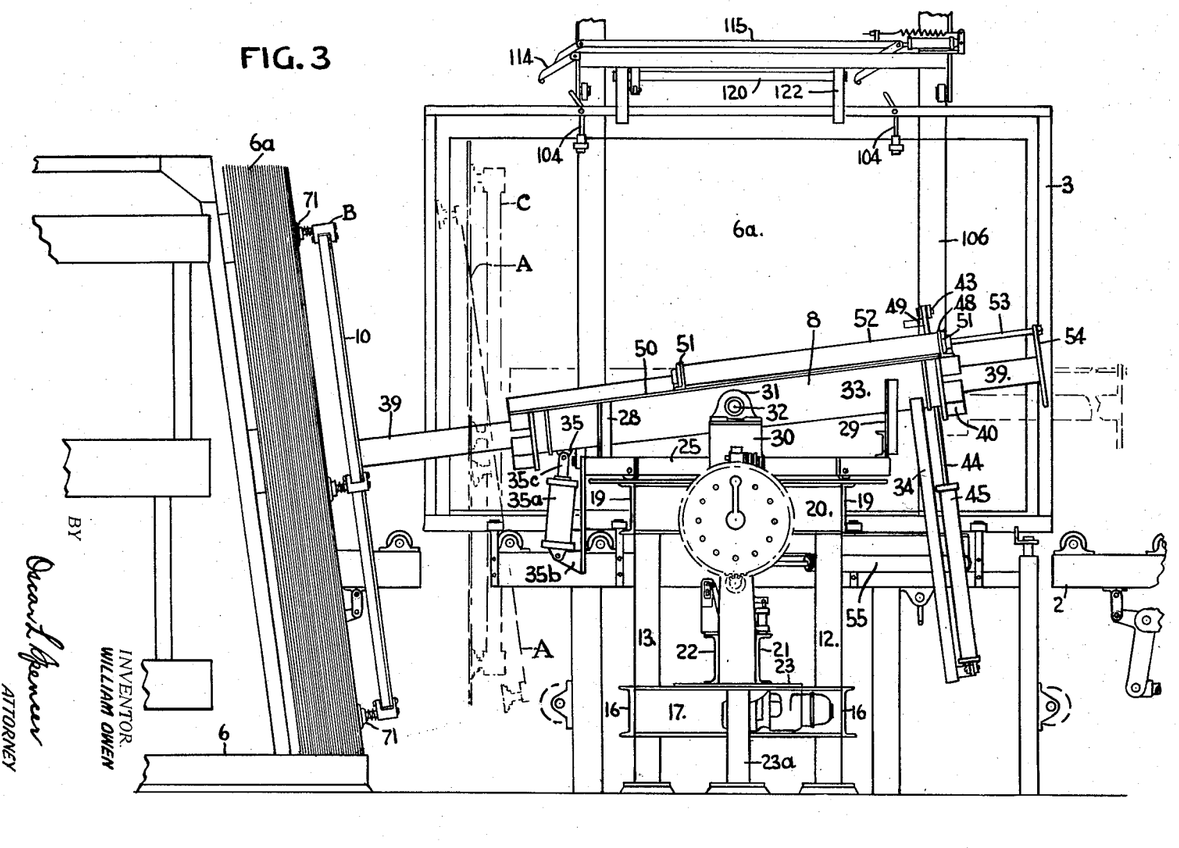
Fig. 3 shows in elevation a loading or unloading mechanism and a basket partially loaded with glass sheets.
Figure 4:
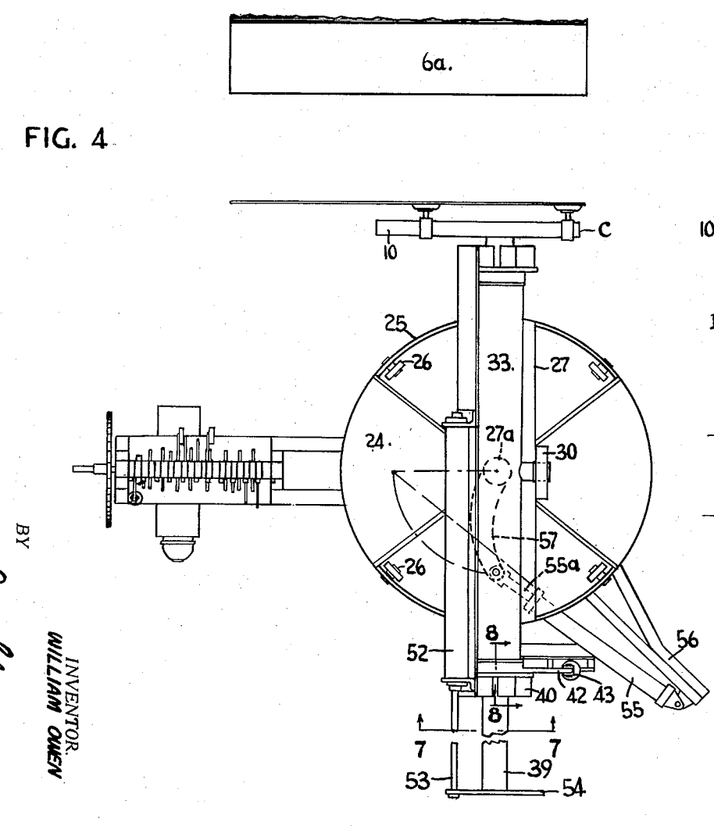
Fig. 4 shows a plan view of the mechanism of Fig. 3 as applied to a loading mechanism in position for both horizontal and vertical rotation of the glass sheet before insertion into the basket.

Referring now to Fig. 3 of the drawings wherein a glass supporting basket 3, glass pack 6a and loading mechanism 8 are shown in assembled position preliminary to loading a sheet of glass within the basket, the vacuum frame 10 of the loading device 8 is shown in engagement with the outer sheet of glass pack 6a. The complete cycle of operations of the loading device 8 is consecutively illustrated in Figures 3, 4 and 5. In completing a cycle of operation of the loading device the vacuum frame 10 consecutively assumes five separate positions indicated as A, B, C, D, and E on Figs. 3, 4, and 5. Vacuum frame initial or starting position A is shown in dotted lines on Fig. 3, position B is shown in full lines on Fig. 3, and position C is shown in dotted lines of Fig. 3 of the drawings. Fig. 4 of the drawings shows the frame 10 in full lines at position C and in dotted lines at position D. On Fig. 5 the frame 10 is shown in dotted lines for position D and full lines for position E.

The loader 8 includes the ram supporting frame members 11, 12, 13 and 14 connected adjacent their lower ends by the frame members 16 and 17 while at the top the frame members are connected by suitable framing members 19 and 20. Extending rearwardly from the frame members 11 and 12 are the frame members 21 and 22 and connected thereto by means of a suitable base plate 23. The free ends of the members 21 and 22 are supported upon a suitable frame member 23a. Turntable plate 24, which is supported by the frame members 11, 12, 13, and 14, has mounted thereon a suitable turntable 25 having bearing rollers 26 engaging the turntable plate 24. Integrally formed with the turntable 25 is a ram cradle comprising a base member 27 having a pair of spaced upright members 28 adjacent one end and a pair of longer upright members 29 adjacent the opposite end. The ram cradle and turntable being pivotally connected to the turntable base plate by means of a suitable pivot pin 27a which is rigidly connected with member 27 and depends below plate 24. At opposite sides of the ram cradle member 27 and on a center line of the turntable are suitable support members 30 upon which are mounted trunnion bearings 31.

Mounted in the bearings 31 by suitable pivots 32 is a ram trunnion member 33, the ram trunnion frame 33 being disposed between the guides 28 and 29 of the turntable and movable vertically relative to the guides 28 and 29 as the trunnion frame 33 pivots on the members 32. Depending from one end of the trunnion frame 33 and rigidly connected therewith is a ram rotating supporting member 34. Adjacent the opposite end of the trunnion frame 33 is the trunnion frame tilting cylinder piston connection member 35. The trunnion frame tilting cylinder 35a is pivotally connected to a bracket 35b depending from turntable 25 and the cylinder ram 35c is pivotally connected with the member 35. Each end of trunnion frame 33 has mounted therein a suitable flanged bushing member 36.

Figure 7:
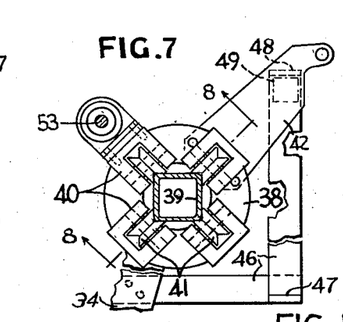
Fig. 7 shows a section through the loading mechanism ram on lines 7—7 of Fig. 4.
Figure 8:
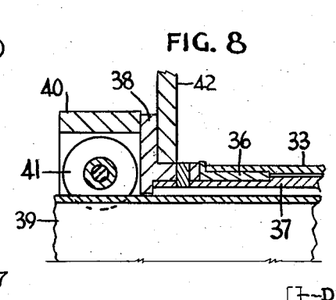
Fig. 8 shows a section through the loading mechanism ram on lines 8—8 of Fig. 4.

Disposed within the trunnion frame bushings 36 and extending beyond each end of trunnion frame is a hollow ram sleeve member 37. Mounted on the extending portions of member 37 and secured thereto are the flanged ram bearing support members 38, all as shown in Figs. 7 and 8. Each member 38 has a central aperture through which the ram 39 extends. The ram bearings are four in number mounted on the flange of each member 38 and each comprises a block member 40 with roller 41 journeled therein. At the rear of ram trunnion frame 33, the flange member 38 has an arm 42 fastened to the rear face of the flange. The free end of arm 42 has a suitable aperture in which is journaled the pin 43 connecting the arm 42 with the piston 44 of the ram rotating cylinder 45. Mounted on the supporting bracket 34 for cylinder 45 is a suitable stop bracket 46 which extends upwardly above the ram trunnion frame 33 and adjacent the arm 42. Bracket 46 has mounted thereon suitably spaced abutments 47 and 48 which selectively engage with the stop 49 on arm 42 to limit rotation of the ram as hereinafter described. Secured to the tops of two opposite ram bearing blocks 40 and above ram trunnion frame 33 is a suitable member such as plate 50. This plate provides a support for suitable brackets 51 between which is mounted the ram reciprocating cylinder 52. The piston 53 of the latter cylinder is connected to one end of ram 39 by means of the plate 54 secured to the ram. The ram trunnion frame rotating cylinder 55 is pivotally connected to a suitable bracket 56 mounted beneath turntable plate 24. The piston 55a of cylinder 55 is pivotally connected to a lever 57 disposed beneath turntable plate 24 and mounted on the end of turntable pivot pin 27a.

Figure 12:
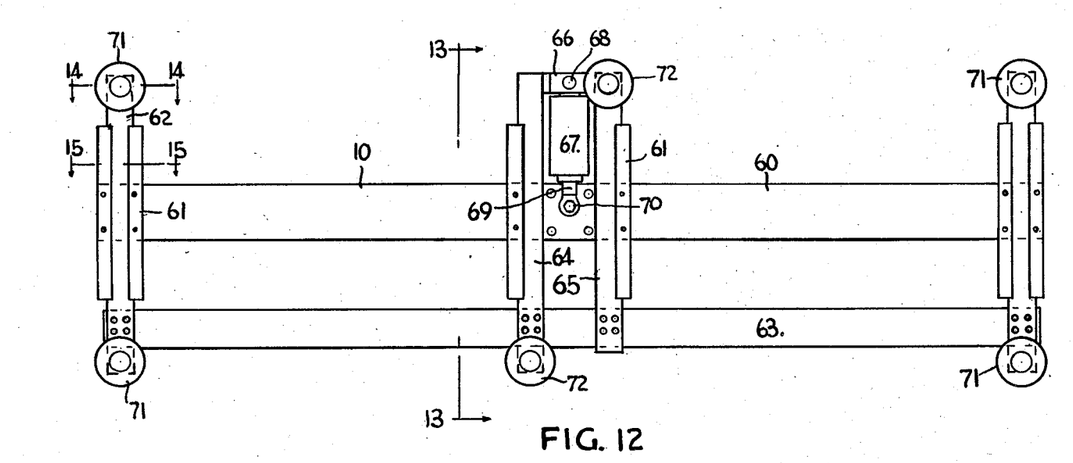
Fig. 12 shows a front elevation of the vacuum frame mounted on one end of the ram for handling the glass sheets.
Figure 13:
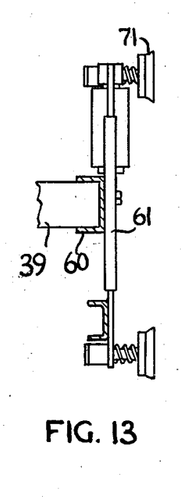
Fig. 13 shows a section on lines 13—13 of Fig. 12.
Figure 14:
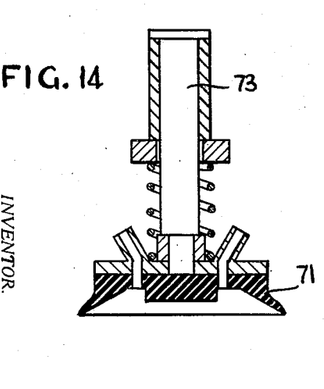
Fig. 14 shows a section through a vacuum cup taken on lines 14—14 of Fig. 12.
Figure 15:
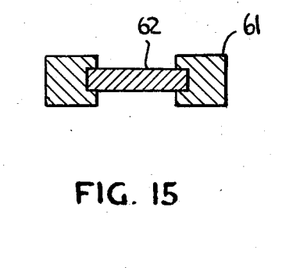
Fig. 15 shows a section taken on lines 15—15 of Fig. 12.
Figure 16:
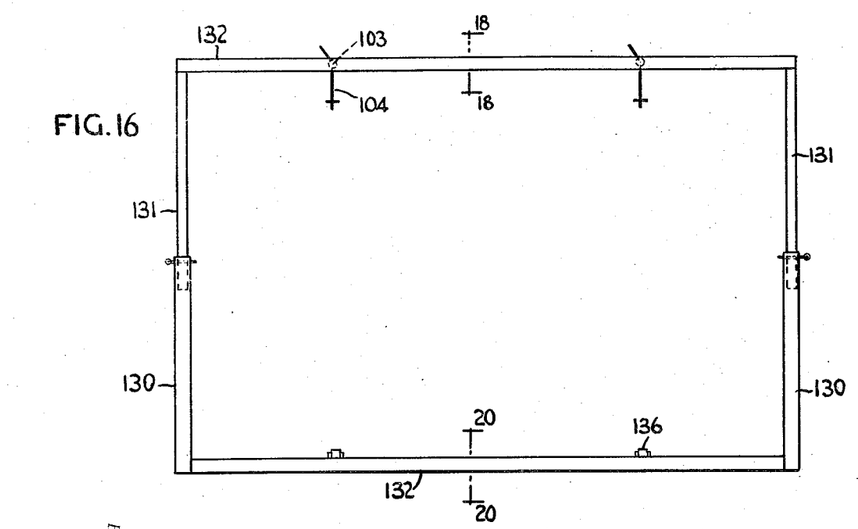
Fig. 16 shows a front elevation of the basket into which the glass is loaded by the loading mechanism.
Figure 17:
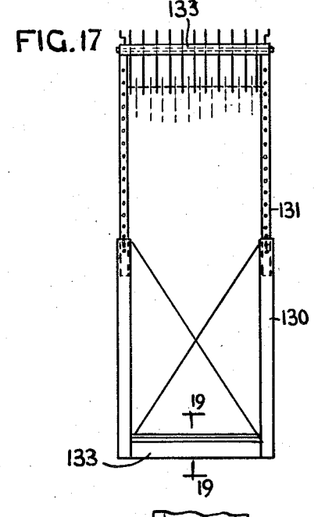
Fig. 17 shows an end elevation of the basket of Fig. 16.

At the front end of the ram 39 is a vacuum frame 10 for supporting the glass during the loading or unloading operation. This frame, as shown in Fig. 12, is constructed for limited telescopic movement and comprises a center member 60 rigidly connected with the ram 39. At each end of the member 60 are mounted spaced slotted guide bars 61 between which are slidably disposed the vacuum cup support bars 62. These bars are connected adjacent one end by means of an operating bar 63. Intermediate the ends of the member 60 are a third pair of guide bars 61 between which is mounted U-shaped frame having spaced arms 64, 65 which are rigidly connected with operating bar 63. The upper ends of the arms 64, 65 are connected by a suitable yoke member 66 from which is pivotally suspended a suitable air cylinder 67 by means of the pin 68. The piston 69 of the air cylinder extends downwardly and is secured to the member 60 by means of the pin 70. When air is admitted to the cylinder 67 raising its piston and piston rod 69 the members 60, 63 and associated vacuum cup support members 62 are raised a suitable distance relative to the ram for a purpose to be hereinafter described. The vacuum cup support members 62 each have two vacuum cups 71 attached adjacent the ends thereof. The U-frame members 64 and 65 each have one vacuum cup 72 attached thereto. These vacuum cups are standard equipment in the glass industry and are equipped with both a vacuum and air inlets. Preferably the cups 71, 72 are mounted on the members 62, 64 and 65 by means of spring-urged spindles 73 so as to permit a slight resiliency between the frame and the glass when the ram first moves the cups against the glass.

Figure 9:
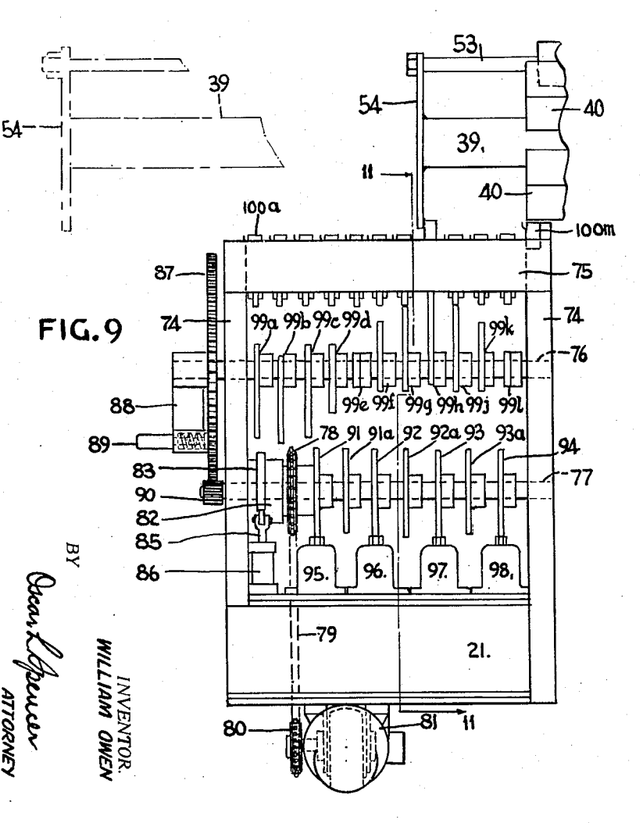
Fig. 9 shows in enlarged view a side elevation of the control cams for the loading mechanism.
Figure 10:
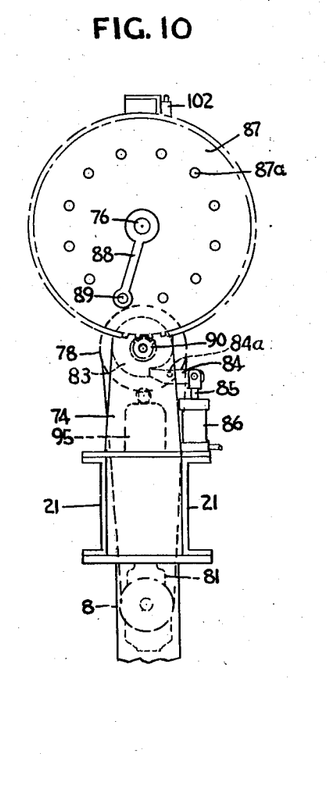
Fig. 10 shows an end elevation of the controls of Fig. 9.
Figure 11:
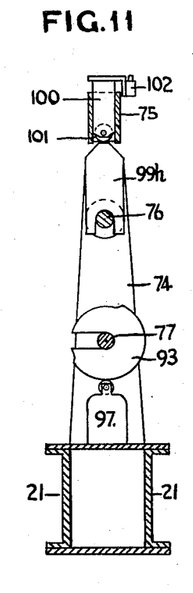
Fig. 11 shows a section taken on lines 11—11 of Fig. 9.

Referring now to Figs. 9, 10 and 11 wherein are shown enlarged views of the ram control mechanism, the control mechanism is mounted between spaced end members 74 which are in turn supported in the frame members 21. The upper ends of the members 74 are connected by the guide members 75. Journaled in the members 74 are the spaced cam shafts 76 and 77. The cam shaft 77 is driven by a suitable chain sprocket 78 journaled thereon and connected by a suitable chain drive 79 to the motor sprocket 80 of the motor 81 suitably suspended from the frame members 21. Mounted on the shaft 77 intermediate the chain sprockets 78 and adjacent end member 74 is a suitable clutch member having a driving clutch member 82 attached to a chain sprocket 78 and journaled on the shaft 77. A driven clutch member 83 is keyed to the shaft 77. The clutch is controlled by the trip lever 84 pivotally mounted by pin 84a on the member 74 and having one end engaging a stop on the keyed driven clutch member 83 while the opposite end is pivotally connected to the piston rod 85 of the operating cylinder 86. The cam shaft 76 has an indexing gear plate 87 journaled thereon outwardly of the member 74. An indexing arm 88 is keyed to the shaft 76 and releasably connected with the indexing gear plate 87 by means of the spring loaded movable locking pin 89. The indexing gear plate 87 is in turn driven by the pinion 90 keyed to the other cam shaft 77. The pitch diameters of the gear 87 and pinion 90 are such that the shaft 77 makes twelve complete revolutions to one revolution of the shaft 76.

The operations of the loader ram 39 are controlled by the cam members 91, 92, 93 and 94 all keyed to shaft 77. The cam 91 operating the control valve 95 supplying air to the ram tilting cylinder 35a, the cam 92 controlling the air valve 96 for actuation of the ram reciprocating cylinder 52, the cam 93 operating the control valve 97 supplying air to the ram trunnion frame turning cylinder 55 and the cam 94 operating a control valve 98 supplying air to the ram rotating cylinder 45. Control of the movements of vacuum frame 10 in loading and unloading glass from the baskets 3 is afforded by cams 99a to 99l inclusive keyed to the shaft 76. These latter cams 99 selectively operate the ram stop fingers 100a to 100m inclusive which latter are slidably mounted between the members 75. Each of the members 100 have pivotally mounted therein a roller member 101 which is selectively engaged by the cams 99. As illustrated in Fig. 11 of the drawings each member 100 has incorporated therewith a microswitch 102 for control of the glass sheet spacing fingers 104 to be hereinafter described. It will be noted that the member 100m is not mounted for vertical movement and is rigidly attached to the adjacent members 74.

In connection with the cams 99 operating the ram stop fingers 100 it will be noted that the cams 99 consecutively contact and raise each successive member 100 during one complete revolution of the shaft 76 for the purpose of positioning the glass sheets in the loading basket. If during the loading and unloading of the basket a sheet of glass should become broken or for any other reason it should become desirable to repeat a ram operation this may be effected by advancing or reversing the rotation of the shaft 76 having the cams 99 mounted thereon. To do this the pin 89 of the indexing arm 88 may be retracted from engagement with aperture 87a of the indexing plate 87 thereby immediately stopping rotation of shaft 76. Thereafter the indexing arm 88 is rotated to advance or reverse rotation of the shaft 76 to re-position the desired cam 99 so as to repeat the desired cycle or advance to the desired stopping position of the ram. Upon releasing the pin 89 for re-engagement with the appropriate opening 87a in the indexing plate, rotation of the shaft 76 will be resumed. It should be here noted that manipulation of the indexing arm 88 to interrupt the sequential operation of the cams 99 on shaft 76 does not affect operation of the ram control cylinders through the cams mounted on shaft 77. This is so by reason of the shaft 77 making one complete rotation to effect contact by one of the cams 99 of shaft 76 with its associated ram control member 100. Hence to interrupt rotation of the shaft 76 does not interfere with the rotation of shaft 77 and merely advances or repeats the sequential operation of the cams 99 after shaft 77 completes its then existing cycle of rotation.

Figure 22:
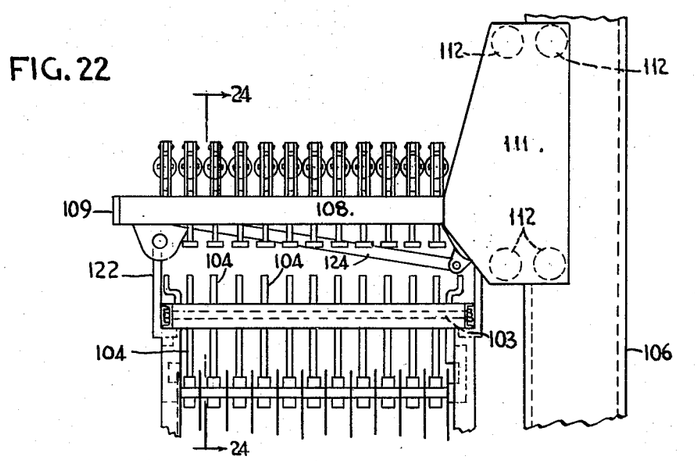
Fig. 22 shows in enlarged detail the control mechanism for the basket glass spacing members.
Figure 23:
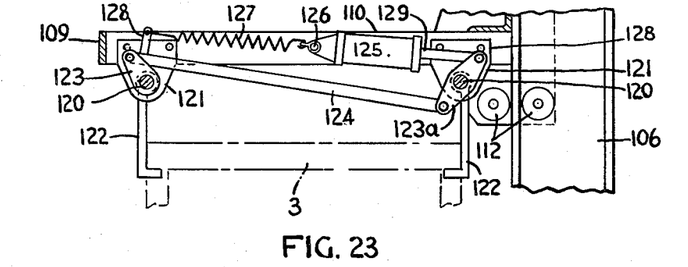
Fig. 23 shows in enlarged detail the basket clamping mechanism.
Figure 24:
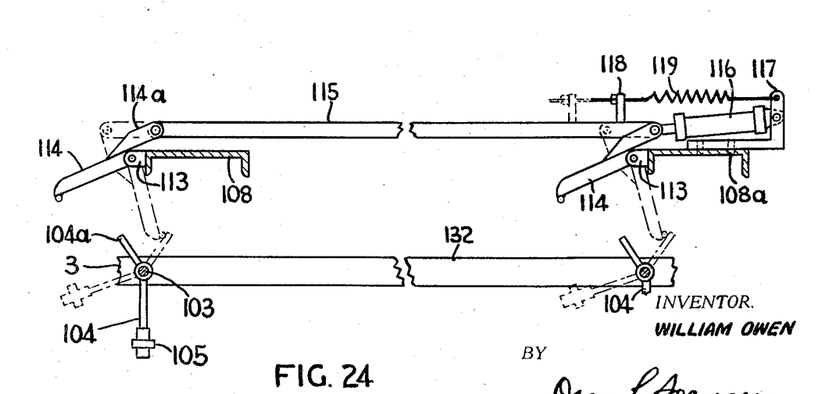
Fig. 24 shows a transverse section through the basket on the lines 24—24 of Fig. 22.

Referring now in detail to Figs. 22 to 24 inclusive of the drawings, wherein is illustrated the basket control and glass spacing mechanism, each basket 3 is provided with a pair of transverse rods 103 upon which are journaled the glass spacer members 104. Each member 104 has a bottom portion 105 preferably of asbestos for maintaining the glass sheets in spaced relation and an upper portion 104a for engagement with the operating mechanism therefor. The basket positioning frame comprises a pair of upright members 106 suitably connected at their bottom portion to the basket conveyor section 2 and the tops of the members 106 are connected by a suitable tie member 107. A control mechanism for each of the pairs of members 104 is mounted on a suitable substantially rectangular carriage comprising side members 108 connected by the members 109 and framing members 110. This entire frame is mounted on the members 106 by means of suitable contact members such as gusset plates 111 and the rollers 112 pivotally mounted on the plates 111 for contacting one flange of the upright members 106.

At one side of each of the platform members 108 are mounted a plurality of brackets 113 from which are suspended the operating arms 114 for engagement with the glass spacer members 104. As shown in Fig. 24 of the drawings the arms 114 at opposite sides of the platform are connected and operated by a mechanism comprising a connecting bar 115 pivotally connected to the upper ends 114a of the members 114 and is also attached to an air cylinder 116 pivotally mounted on the bracket 117 attached with the adjacent platform member 108. The bar 115 adjacent the cylinder 116 has an upwardly extending arm 118. A tension spring 119 is connected with this arm 118 and with the bracket 117 above the cylinder 116. The arms 114 and their associated mechanism are normally in the position shown by Fig. 24. When air is admitted to the cylinder 116 for actuating the piston thereof and extending the piston rod outwardly, the members 114 are rotated to contact with the portion 104a of the members 104 to rotate the latter upwardly as shown in dotted lines on Fig. 24. When the air is exhausted from behind the piston, in the cylinder 116, the tension spring 119 returns the piston within the cylinder to release position and retracts rod 115 to rotate the arms 114 out of contact with the member 104 permitting them to fall by gravity into position to engage and to space the glass sheets. It is to be understood that each pair of arms 114 on opposite sides of the platform are connected by the operating mechanism including the bar 115 and cylinder 116. In other words there are as many cylinders as there are opposing pairs of arms 114. In the present case the basket 3 is adapted to receive twelve sheets of glass and therefore there are twelve pairs of arms 114 and twelve operating mechanisms.

In order to ensure engagement between the members 114 and 104, a basket clamping mechanism is also mounted beneath the aforementioned platform and at opposite sides of the basket. As shown in Fig. 23 of the drawings, a rotatable shaft 120 is suitably journaled beneath the operating platform above the front and rear faces of the basket 3 by suitable bracket members 121. Each shaft 120 has keyed thereto a pair of spaced basket clamps 122. These shafts 120 also have keyed thereto operating crank arms 123 and 123a which are connected by the bar 124. The crank arm 123a has an extension thereto upon which is pivotally connected piston rod 129 of an operating air cylinder 125. The opposite end of the cylinder 125 is pivotally mounted beneath the operating platform upon the member 110 by means of the pin 126. A tension spring 127 is connected at one end to pin 126 and at the other end to the arm 128 of bar 124. When air is admitted to the cylinder 125 the piston rod 129 is extended and rotates the clamps 122 into engagement with the basket, placing spring 127 in tension. When the air is exhausted from the cylinder 125 the tension springs 127 retract arm 128 and rotate the crank arms 123, 123a to release clamps 122 from the basket 3. When the clamps 122 are engaged with the basket 3, they vertically position the portions 104a of spacer members 104 relative to the arms 114 ensuring an operable connection between them as the arms 114 are rotated as hereinbefore described.

Figures 18, 19:
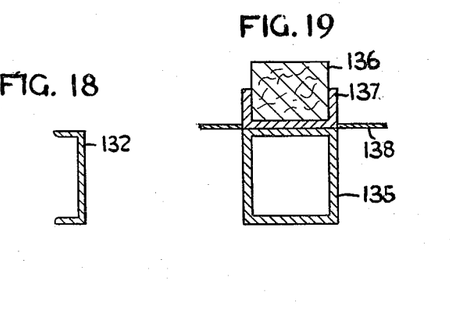
Fig. 18 shows a section through a top framing member of the basket of Fig. 16.
Fig. 19 shows a section taken through the floor of the basket of Fig. 16, illustrating framing details and support for the glass within the basket.
Figure 20:
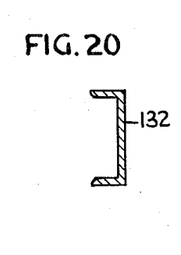
Fig. 20 shows a section through a bottom framing member of the basket at lines 20—20 of Fig. 16.
Figure 21:
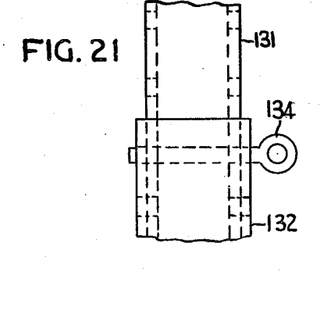
Fig. 21 shows in enlarged detail the adjustable connection between the basket corner posts.

Referring now to Figs. 16 to 21 inclusive of the drawings the glass receiving baskets 3 may be of any suitable construction and as illustrated comprise corner members 130 and 131 which are telescoped together to provide vertical adjustment of the height of the basket. The free ends of corner members 130 and 131 on both the front and rear faces of the baskets are connected by suitable members such as the channel member 132 and at the side faces of the basket by similar members 133. Extending between the top members 132 are the rods 103 upon which the members 104 are pivotally mounted. The members 132 at the top of the basket may be connected by any suitable bracing means such as X bracing formed of rods so as to permit vertical free circulation of air between the sheets of glass supported within the basket. At the sides of the basket the space between the telescoping arms 130 and 131 are open so as to permit circulation of air. As shown in Fig. 21 of the drawings, member 131 is adjustably connected within member 130 by any suitable means such as a removable pin 134 engaging suitable registering apertures in the member 130 and 131. The base of the basket is completed by the rectangular transverse frame members 135 which are suitably connected to the adjacent members 132. Mounted on each member 135 are suitable glass supporting members which preferably comprise a suitable resilient glass engaging member such as the asbestos square 136 mounted in a confining channel 137 suitably secured to the members 135. Preferably a metal floor 138 completes the bottom of the basket between the members 135 as indicated in Fig. 19 of the drawings.

Figure 1:
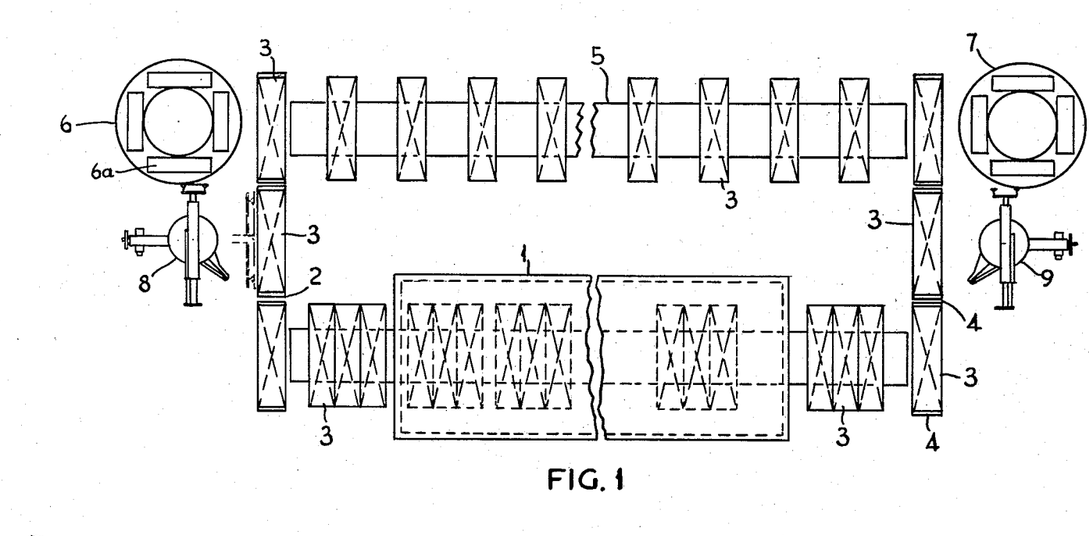
Fig. 1 shows a plan view of the loading mechanism, the lehr, baskets for receiving the glass, and an unloading mechanism.
Figure 2:
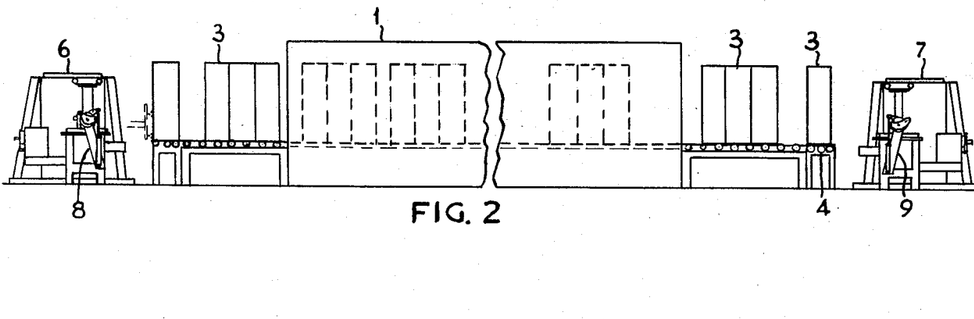
Fig. 2 shows a side elevation of the mechanisms of Fig. 1.
Figure 5:
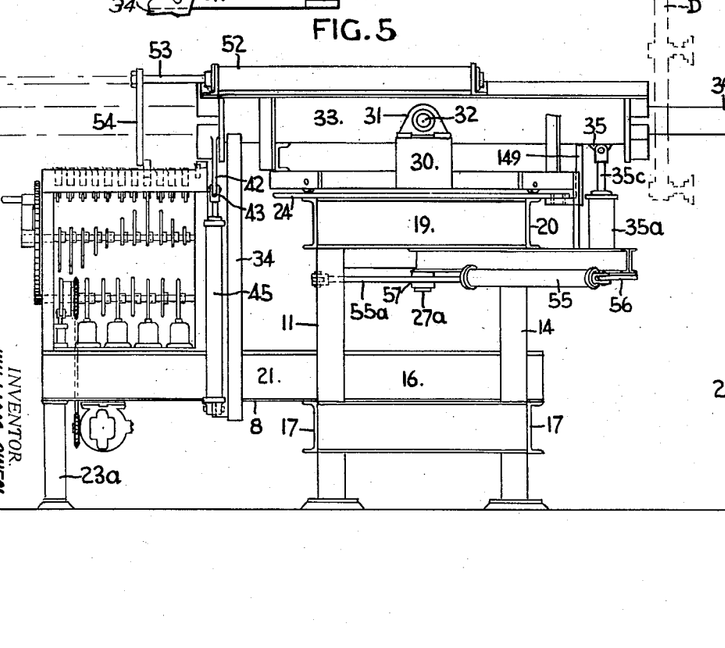
Fig. 5 shows in side elevation the loading mechanism inserting a sheet of glass into the basket with the top of the basket control mechanism broken away.

The operation of the loading mechanism and the controls therefor will now be described for one cycle of operation. One cycle of operation comprising movements of the loading or unloading mechanism from the time the glass sheet engaging vacuum frame moves, from starting position, into engagement with the sheet until the mechanism deposits the sheet and returns to starting position. It is to be understood that the unloading operation is the reverse of the loading operation except where otherwise specifically indicated. The normal starting position of the loading mechanism is illustrated in Fig. 3 of the drawings with the vacuum frame 10 as shown in dotted lines designated by reference letter A. In this position, the ram 39 and trunnion frame 33 as shown in full lines except that ram 39 is retracted to the right in Fig. 3 so as to move vacuum frame 10 into the position indicated by reference letter A. In this position, the turntable 6 has a full supply of stacks of glass sheets 6a which are preferable, inclined to the vertical on a slope of about 1½ inches to 1 foot. The ram trunnion frame 33 is also similarly inclined under control of cylinder 35a. Immediately behind the loading mechanism 8 is a glass receiving basket 3 mounted upon the tracks 2 as best shown in Figs. 1, 3 and 5 of the drawings.

Figure 25:
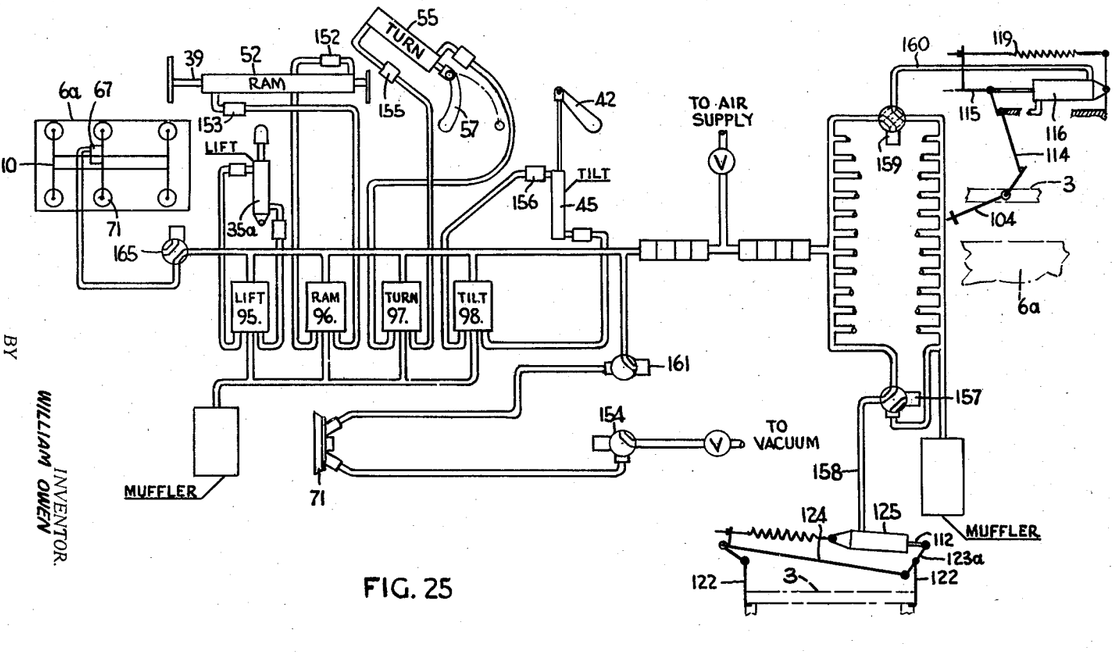
Fig. 25 is a schematic diagram of the assembled air, vacuum and electrical controls for the loading mechanism and basket glass spacing fingers.

After the operating mechanism has been energized by the operator pressing the starter button of Fig. 25, air is admitted to the ram cylinder 52 and advances the ram 39 and vacuum frame 10 into engagement with the outer sheet of glass pack 6a which brings the frame 10 into position shown by reference letter B. Upon engagement of the vacuum cups 71 with the glass sheet 6a, vacuum is applied to the cups and adhering them to the glass. Air is then admitted simultaneously to ram cylinder 52 for moving the ram to the right (Fig. 3) into fully retracted position and to ram trunnion tilting cylinder 35a for raising the ram trunnion frame 33 into horizontal position. The result of these two movements places vacuum frame 10 and associated glass sheet in position C indicated in dotted lines on Fig. 3 and by full lines on Fig. 4. After the trunnion frame 33 reaches horizontal position, air is simultaneously admitted to trunnion turning cylinder 55 and ram rotating cylinder 45. Cylinder 55 actuates lever 57 to turn the ram trunnion and vacuum frame 90° to the right, as viewed in Figs. 3 and 4, and simultaneously cylinder 45 actuates lever 42 to rotate the ram and vacuum frame 90° in a vertical plane to bring the vacuum frame 10 into the position D shown in dotted lines on Fig. 4. During the rotation of turntable 25, trunnion frame 33 engages the bearing member 33a which will prevent the trunnion frame 33, ram 39 and vacuum frame 10 from dropping below horizontal position while frame 10 is in position D should cylinder 35a fail to support the trunnion frame 33.

Figure 6:
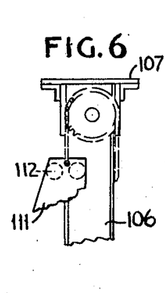
Fig. 6 shows the top of the basket control mechanism broken away from Fig. 5.

After vacuum frame 10 and associated sheet 6a arrives at position D, ram cylinder 52 is again activated and moves frame 10 into the basket 3. The movement of the frame into the basket is controlled by the mechanism shown in Fig. 6 of the drawing. The finger 100 disposed in the path of movement of the plate 54 on end of ram at the same time actuates cylinder 116 of the basket control mechanism to release fingers 104 which drop down to retain the plate in vertical spaced position. After ram plate 54 engages the appropriate finger 100 to stop movement of the frame, pressure is released from cylinder 67 of vacuum frame 10 and lowers the sheet 6a, by gravity, upon the supports 136. Simultaneously, with the lowering of the sheet 6a the vacuum is released from cups 71 and air is applied to the cups to ensure release from the glass. Ram cylinder 52 is again activated to retract the ram and frame 10 to position D, whereupon cylinders 45 and 55 are activated to return the ram and trunnion to position C. After exhausting pressure from cylinder 35a the trunnion returns by gravity to position A or starting position.

The control mechanism for the cylinders which operate the loader mechanism are shown in detail in Figs. 9, 10 and 11 of the drawings and the entire operating system, except for the cam indexing plate 87 and associated cam mechanism, is shown schematically on Fig. 25 of the drawing. So far as possible, the operating system of Fig. 25 is shown at the beginning of a cycle of movement of the ram and vacuum frame 10. A complete cycle of movement of frame 10 is position A to B to C to D to E and return from E to D, etc.

Referring now to Figs. 9, 10 and 11 of the drawings, the operator will push button 150 (Fig. 25) starting the motor 81 (Fig. 6) which drives the cam shaft 77. He then pushes clutch trip push button 151 (Fig. 25) which actuates clutch trip cylinder 86 (Fig. 6) causing piston 85 to rise and releases clutch 83 for engagement with rotating chain sprocket 78 to cause cam shaft 77 to rotate. Pinion 90 on shaft 77 rotates index gear plate 87 causing rotation of cam shaft 76. Cam 92 on shaft 77 (Fig. 9) upon rotation actuates control valve 96 admitting air to ram cylinder 52 and in so doing closes the exhaust port of valve 152. The exhaust port of valve 153 being open, the ram moves to the left and advances the vacuum frame 10 into engagement with glass 6a. During this period cam 91a has rotated to engage a switch which, upon closing, actuates solenoid valve 154 and admits vacuum to the cups 71. The vacuum frame now has hold of the glass sheet 6a and at this point rotating cam 91 (Fig. 9) actuates control valve 95 admitting air to cylinder 35a and raises the ram toward horizontal position. Simultaneous with actuation of cylinder 35a, cam 92 acting through control cylinder 96 admits air to valve 153 causing ram 39 to move to the right or into position C (Fig. 3). Cam 93 (Fig. 3) has now moved to a position to actuate control valve 97 admitting air through valve to cylinder 55, thus rotating arm 57 to turn the ram into position D (Fig. 4) upon turntable 25 and simultaneously therewith cam 94 has actuated control valve 98 admitting air to cylinder 45 through valve 156 to retract arm 42 and rotate the ram and vacuum frame 90° as it moves into position D (Fig. 4). Upon the ram and vacuum frame reaching position D, cam 92 again actuates control valve 96 admitting air through valve 152 causing ram and frame 10 to move towards the basket 3.

The basket 3 upon moving into position as shown in Fig. 4 had actuated solenoid valve 157 into the position shown in Fig. 25 and air entering cylinder 125 through inlet conduit 158 has caused clamps 122 to engage the basket 3 as shown in Fig. 23. The basket 3 in moving into position (Fig. 4) had actuated a second group of twelve solenoid valves 159 causing air to be admitted through conduit 160 into the twelve cylinders 116 to actuate trip fingers 114 and raise all the glass separators 104 on basket 3.

The ram 39 in advancing vacuum frame 10 and sheet 6a into basket 3 has a plate 54 on the rear of the ram which engages the appropriate stop 100, raised by the associated cam 99 (Fig. 9) to position the ram within the basket for releasing the plate 6a. Ram plate 54 when engaging stop 100 also actuates a suitable switch 102 on the stop 100 to actuate the appropriate valve 159 to exhaust position so as to exhaust air from cylinder 116 whereupon tension spring 119 retracts bar 115 releasing its associate basket fingers 104 to drop down in front of the newly inserted sheet 6a. At this point cam 93a actuates solenoid valve 165 to release air from cylinder 67 causing vacuum frame 10 to drop by gravity and deposit the glass 6a upon supports 136 at the bottom of the basket. At this point cam 91a has rotated so as to release its associated switch thereby exhausting the vacuum through valve 154 and simultaneously therewith cam 92a moves to engage an appropriate switch which actuates valve 161 admitting air to cups 71, releasing them from plate 6a.

The ram and vacuum frame now reverse the previous cycle of movements as cam 92 again acts through valve 96 to retract ram 39, cams 93 and 94 act through valves 97 and 98 to actuate cylinders 55 and 45 respectively to return the frame 10 to position C. Upon the return of the ram and frame 10 to position C, cam 91 actuates valve 95 to exhaust air from cylinder 35a causing the frame 10 to drop to position A and at the same time cam 93a actuates valve 165 to energize cylinder 67 to raise the vacuum frame 10 to normal glass engaging position.

During the described cycle of loading operations cam shaft 77 has made one complete revolution and cam shaft 76 one-twelfth a revolution. In the case of using the mechanism to unload the basket, the starting position would be position E with the vacuum frame in engagement with the outermost sheet of basket 3 and the air exhausted from cylinder 67 of the vacuum. The cams on shafts 76 and 77 would be reversed in operation so that ram stop 100a would be the first to engage ram plate 54, control valves 159 for all basket glass spacers 104 would be in exhaust position and selectively actuated to raise glass spacers from the glass. Cams 91, 91a, 92, 92a, 93, 93a and 94 would be arranged to first raise frame 10 to lift the glass from the floor of the basket then successively retract the ram, rotate the ram trunnion frame in a horizontal plane, rotate the ram and frame 10 in a vertical plane, lower ram trunnion frame 33 below horizontal position and then extend ram to position plates 6a on the turntable, after which vacuum would be cut off from vacuum cups 71 and air admitted to release the cups from the glass sheet. After that the ram would return to position D to reengage another sheet.

I claim:

1. In a glass handling mechanism of the character described having a rotating and reciprocating ram, a control mechanism for the ram comprising a pair of rotating cam shafts, a pinion keyed to one of the shafts, a gear journaled upon the other shaft and engaged with the pinion, a plurality of peripheral equally spaced apertures in the gear disposed inwardly of the periphery thereof and of such spacing that the distance between adjacent apertures equals circumferential travel of the gear for each complete rotation of the pinion, a crank arm keyed to the gear shaft, a spring loaded pin movably mounted in the crank arm for selective engagement with an adjacent gear aperture, a plurality of spaced cams on the pinion shaft sequentially operating fluid pressure actuated devices for activating the ram, and a plurality of cams on the gear shaft for sequentially decreasing longitudinal movement of the ram in one direction for each complete rotation of the pinion shaft.

2. In a glass handling mechanism for stacking glass sheets in spaced relation within a container, in combination, a rotating and reciprocating ram having a device at one end thereof for positioning glass sheets within the container, a control mechanism for the ram causing progressive shortening of the forward stroke of the ram as each glass sheet is disposed within the container, a plurality of spaced glass separator member mounted on the container for movement relative thereto and normally disposed in the path of movement of the glass into the container, means releasably holding the glass separators out of the path of movement of the glass and selectively actuated to release the individual separators for return to normal position in front of the glass sheet after each glass sheet is disposed within the container.

3. In a glass handling mechanism for stacking a plurality of glass sheets in successive containers, in combination, a reciprocating ram having a glass handling device at one end thereof for movement toward and away from the container, a container positioning device disposed in the path of movement of the reciprocating ram, means on the positioning device for engaging the container to position same for loading, a plurality of glass spacer element on the container disposed in the path of movement of the glass, means on the positioning device for raising the glass spacer elements of the container out of the path of movement of the glass when the container is in glass receiving position and means controlled by reciprocation of the ram for selectively releasing the respective glass spacers after a glass sheet is positioned within the container.

4. In a glass handling device of the character described, in combination, a supporting frame, having an upper surface serving as a turntable support, a turntable pivotally mounted on the frame for horizontal rotary movement relative thereto, trunnion bearings on the turntable, a ram trunnion frame supported on the trunnion bearings for tilting movement in a vertical plane relative to the turntable, bearing supports for the ram mounted at each end of the trunnion frame for rotary movement in a vertical plane relative thereto, a reciprocating ram disposed within the trunnion frame upon the ram bearing supports and rotatable with said ram bearing supports, a fluid pressure actuated cylinder mounted above the trunnion frame upon the ram bearing supports for reciprocating the ram, and a fluid pressure actuated cylinder suspended from the ram trunnion frame and operably connected with the ram bearing supports for selectively rotating the ram bearing supports relative to the trunnion frame independently of the reciprocation of the ram.

5. The device of claim 4 and further including a glass sheet engaging and supporting frame rigidly secured to the ram.

6. The device of claim 5 in which the glass sheet engaging and supporting frame includes means for movement of the glass sheet normal to the longitudinal axis of the ram and relative to the ram.

7. The device of claim 5 in which the glass engaging and supporting frame includes a supporting member rigidly secured to the ram, vacuum cup supporting plates secured to one another and slidably mounted on said supporting member, vacuum cups secured to said supporting plates, and fluid pressure actuated means connected to the supporting member and to one of said supporting plates for movement of said plates relative to said supporting member.

8. In a glass handling device of the character described, in combination, a supporting frame, a turntable pivotally mounted on the supporting frame for horizontal rotary movement relative thereto, bearing supports mounted on the turntable for rotary movement about an axis normal to the axis of rotation of said turntable, a ram mounted in the bearing supports for reciprocal motion relative thereto and rotary motion therewith, said ram having laterally extending flange, a glass engaging and supporting frame rigidly secured to the ram, fluid pressure actuated means connected to the supporting frame and to the turntable for rotating the turntable in the horizontal plane, fluid pressure actuated means connected to the turntable and to one of said bearing supports for rotating the bearing supports and the ram about the longitudinal axis of the ram, fluid pressure actuated means connected to the bearing supports and the ram for reciprocating the ram along its longitudinal axis, said means connected to the bearing supports and the ram operating independently of said means connected to the turntable and at least one of said bearing supports, and a mechanism for sequentially decreasing longitudinal movement of the ram in one direction including a cam shaft mounted on the supporting frame, cams on the shaft, a supporting plate between the cams and the ram, stop fingers slidably mounted in the supporting plate and selectively engaged by the cams to be moved into the path of said flange extending from the ram.

References Cited in the file of this patent

UNITED STATES PATENTS

| | | |
|---|---|---|
| 807,118 | Kelly | Dec. 12, 1905 |
| 864,053 | Witherbee et al. | Aug. 20, 1907 |
| 980,004 | Reeder | Dec. 27, 1910 |
| 1,021,710 | Stauft | Mar. 26, 1912 |
| 1,412,568 | Mortensen | Apr. 11, 1922 |
| 1,959,216 | Owen | May 15, 1934 |
| 2,049,850 | Lytle et al. | Aug. 4, 1936 |
| 2,524,846 | Socke et al. | Oct. 10, 1950 |
| 2,541,045 | Ferwerda et al. | Feb. 13, 1951 |